United States Patent
Shinohara et al.

(10) Patent No.: US 7,249,545 B2
(45) Date of Patent: Jul. 31, 2007

(54) NUMERICALLY CONTROLLED LATHE AND METHOD OF MACHINING WORK BY THIS NUMERICALLY CONTROLLED LATHE

(75) Inventors: Hiroshi Shinohara, Kawagoe (JP); Takayasu Saitou, Sayama (JP); Umeo Tsuyusaki, Kawagoe (JP); Toru Takahashi, Sakado (JP)

(73) Assignee: Citizen Watch Co., Ltd., Nishitokyo-Shi, Tokyo (JP)

( * ) Notice: Subject to any disclaimer, the term of this patent is extended or adjusted under 35 U.S.C. 154(b) by 400 days.

(21) Appl. No.: 10/477,413

(22) PCT Filed: Apr. 26, 2002

(86) PCT No.: PCT/JP02/04259

§ 371 (c)(1),
(2), (4) Date: Mar. 29, 2004

(87) PCT Pub. No.: WO02/092266

PCT Pub. Date: Nov. 21, 2002

(65) Prior Publication Data

US 2005/0060859 A1    Mar. 24, 2005

(30) Foreign Application Priority Data

May 15, 2001    (JP)    ............................ 2001-144283

(51) Int. Cl.
*B23B 13/04* (2006.01)

(52) U.S. Cl. ............................ 82/1.11; 82/129; 82/118

(58) Field of Classification Search ................. 82/118, 82/121, 129, 1.11; 700/159, 160, 169, 173, 700/176, 177, 178
See application file for complete search history.

(56) References Cited

U.S. PATENT DOCUMENTS

| | | | | |
|---|---|---|---|---|
| RE33,262 E | * | 7/1990 | Link et al. | 82/120 |
| 5,117,544 A | * | 6/1992 | Kousaku et al. | 29/27 C |
| 5,214,829 A | * | 6/1993 | Minagawa | 29/27 C |
| 5,704,262 A | * | 1/1998 | Baumbusch et al. | 82/124 |
| 5,787,560 A | * | 8/1998 | Schalles | 29/36 |
| 6,742,422 B1 | * | 6/2004 | Shinohara et al. | 82/1.11 |
| 6,971,294 B1 | * | 12/2005 | Shinohara et al. | 82/1.11 |
| 2007/0068350 A1 | * | 3/2007 | Kawasumi et al. | 82/121 |

FOREIGN PATENT DOCUMENTS

| | | | |
|---|---|---|---|
| JP | 57-48402 | | 3/1982 |
| JP | 60-232802 | | 11/1985 |
| JP | 2-48101 | | 2/1990 |
| JP | 3-79201 | | 4/1991 |
| JP | 4-159058 | | 6/1992 |
| JP | 7-227701 | | 8/1995 |
| JP | 10501758 A | * | 2/1998 |
| WO | 96/32224 | | 10/1996 |

* cited by examiner

*Primary Examiner*—Monica Carter
*Assistant Examiner*—Sara Addisu
(74) *Attorney, Agent, or Firm*—Manabu Kanesaka

(57) ABSTRACT

A numerically controlled machine tool can simultaneously perform a variety of machining operations using work on a first main shaft and work on a second main shaft. A first tool post is movable together with a second main shaft in the direction of a main shaft axis and in a direction orthogonal thereto in a plane, while a second tool post is movable at least in the same biaxial direction as the directions of movement of the first tool post. A control device superposes the movement required for the first tool post to machine work on the movement required for the second tool post to machine work, so that the machining operation of the work by the tool on the first tool post and the machining operation of the work by the tool on the second tool post are simultaneously performed.

14 Claims, 11 Drawing Sheets

(a)

(b)

NUMERICALLY CONTROLLED LATHE AND METHOD OF MACHINING WORK BY THIS NUMERICALLY CONTROLLED LATHE

TECHNICAL FIELD

The present invention relates to a numerically controlled lathe which includes two main shafts disposed opposite to each other and which is capable of simultaneously machining two works held on the respective main shafts with a tool attached to a tool post, and a method of machining the work by this numerically controlled lathe.

BACKGROUND ART

A numerically controlled lathe (hereinafter referred to as the NC lathe) which includes two headstocks and tool posts disposed opposite to each other and which is capable of simultaneously machining two works attached to two main shafts with tools attached to the tool posts is known, for example, in Japanese Patent Publication No. 10-501758.

FIG. 11 is a plan view showing a schematic constitution of the NC lathe disclosed in the Japanese Patent Publication No. 10-501758.

A first headstock 520 and a second headstock 530 are disposed opposite to each other on a bed 510 of an NC lathe 5. The first headstock 520 and second headstock 530 rotatably support parallel main shafts 521, 531. These main shafts 521, 531 are arranged so that axes of the main shafts 521, 531 are eccentric. Chucks (not shown) are disposed on tip ends of the respective main shafts 521, 531, and works W1, W2 are grasped by the chucks.

The first headstock 520 is fixed to the bed 510. In the bed 510, guide rails 540 are disposed extending in a Z1-axis direction which is the same direction as that of the axis of the main shaft 531. A carriage 550 is disposed on the guide rails 540, and this carriage 550 is guided by the guide rails 540 by driving drive members such as a servo motor (not shown) to move forwards/backwards in a Z1-axis direction.

Guide rails 570 are disposed in an X1-axis direction crossing at right angles to the Z1-axis on the carriage 550. A carriage 555 is movably disposed in the X1-axis direction on the guide rails 570, and a first tool post 560 and second headstock 530 are disposed on the carriage 555. The second headstock 530 and the first tool post 560 are guided by the guide rails 540, 570 by driving the driving members such as the servo motor (not shown), and are movable in the X1-axis and Z1-axis directions.

The first tool post 560 includes a indexable/rotatable turret plane plate 561 on one side. Onto the turret plane plate 561, a plurality of tools T1 for machining work W1 held by the main shaft 521 of the first headstock 520 are attached. Moreover, by a combination of movements of the carriages 550, 555 in the Z1-axis and X1-axis directions, the tools T1 are positioned with respect to the work W1 to machine the work W1.

A second tool post 580 is disposed opposite to the main shaft 531 of the second headstock 530. An indexable/rotatable turret plane plate 581 is disposed on one side of the second tool post 580. A plurality of tools T2 for machining work W2 attached to the main shaft 531 of the second headstock 530 are attached to the turret plane plate 581. The second tool post 580 is movable along guide rails 582 disposed in parallel with the guide rails 570 in an X2-axis direction which is the same direction as that of the X1-axis.

In this NC lathe 5, the first tool post 560 and the second headstock 530 are disposed on the common carriages 550, 555. Therefore, feed of the tools T1 with respect to the work W1 corresponds to that of the tools T2 with respect to the work W2. Therefore, the same hole-making operation can simultaneously be effected with respect to two works W1, W2.

Moreover, while the tools T2 are moved in the X2-axis direction in synchronization with the movement of the tools T1 in the X1-axis direction, the movement in the X2-axis direction required for machining the work W2 by the tools T2 is added. Accordingly, it is possible to simultaneously perform different machining operations with respect to the works W1, W2.

The above-described NC lathe 5 is capable of simultaneously machining a plurality of works W1, W2 in the same or different manners, and is therefore advantageously superior in a machining efficiency, but there are the following disadvantages.

That is, since relative movement of the tools T1 and T2 with respect to the works W1, W2 in the Z1-axis and Z2-axis directions is determined by the movement of the carriage 550 in the Z1-axis direction, there is a problem that machining modes of the simultaneously machinable works W1, W2 are limited.

Moreover, even when the machining of the work W2 by either one tool, for example, the tool T2 ends in a time shorter than that of the machining of the work W1 by the tool T1, the second tool post 580 has to move following the movement of the first tool post 560 on standby until the machining of the work W1 by the tools T1 ends. This is because even when the tool T2 is changed and the work W2 is to be continuously machined with the next tool, the tool T2 cannot be detached from the work W2, and the next tool cannot be indexed. Therefore, there is a problem that there is much waste of time such as standby and the machining efficiency is bad.

Furthermore, for the NC lathe 5, the second tool post 580 can move only in an uniaxial direction of the X2-axis. Therefore, while the X1-axis is superposed on the X2-axis, machining operations such as a boring operation are carried out, and superposition error is caused. Then, there is a disadvantage that the superposition error appears as a machining quality as it is on the work. Therefore, when the superposition error is large, machining defect is easily generated, and a problem occurs that there is a possibility of a high defect ratio.

An object of the present invention is to provide an NC lathe and a method of machining the work by this numerically controlled lathe in which a variety of machining operations can simultaneously be carried out with respect to the works on the first and second main shafts and in which waste of time such as a waiting time can be reduced as much as possible and in which the machining efficiency is high. Even when the superposition error is generated during the machining operations such as the boring operation, adverse influences by the superposition error can substantially be eliminated.

DISCLOSURE OF THE INVENTION

The present invention relates to a numerically controlled lathe.

In the present invention, there is provided a numerically controlled lathe comprising: first and second main shafts which are disposed opposite to each other and which are movable with respect to each other; first and second tool posts to which a plurality of tools are attached so as to machine works held by the first and second main shafts; and a control device which controls movements of the first and second main shafts and the first and second tool posts. In the lathe, the first tool post, integrally with the second main shaft, is movable in a main shaft axial direction of the second main shaft and in an axial direction crossing at right angles to the main shaft axial direction in a plane. Moreover, the second tool post is movable in a biaxial direction which is the same direction as that of the movement of at least the first tool post. The control device superposes the uniaxial or biaxial movement required for the first tool post to machine the work on the uniaxial or biaxial movement required for the second tool post to machine the work, and outputs an instruction for movement to the first or second tool post, so that the machining operation of the work by the tool attached to the first tool post and that of the work by the tool attached to the second tool post are simultaneously effected.

According to this constitution, the first tool post is movable in the biaxial direction, and the second tool post is movable in the same biaxial direction as that of at least the first tool post. Accordingly, without being influenced by the machining of the work by the tool on the first tool post, it is possible to machine the work by the tool on the second tool post, and degree of freedom in machining the work is enhanced.

Moreover, during the machining of the work by the tool on the first tool post, the second tool post can be moved to detach the tool from the work and to index the next tool.

In the present invention, the second tool post is movable in the biaxial direction including the main shaft axial direction of the first main shaft and the axial direction crossing at right angles to the main shaft axial direction in the plane, and is movable in the axial direction crossing at right angles to the biaxial direction.

Since the second tool post is movable in a triaxial direction in this manner, the degree of freedom in machining the work by the second tool post can further be enhanced. Moreover, the tool can be allowed to abut on the work in the different directions and, for example, the machining operations such as a drilling operation of an outer peripheral surface of the work with a rotary tool are possible.

In the present invention, the tools are linearly arranged and attached along the movement directions of the first and second tool posts, and the tool is indexed by the linear movements of the first and second tool posts in the uniaxial or biaxial direction.

In the present invention, an interval between the tools attached to the first or second tool post may be determined based on an amount of the movement of the first or second tool post required for machining the work by one tool so as to minimize a distance between the tools such that the other tool does not interfere with the work or the first or second main shaft during the machining operation of the work by one tool.

In this constitution, the tool can be indexed in a short time and in a small space, a machining time can be reduced, and the numerically controlled lathe can further be miniaturized.

In the present invention, a time required for machining the work by one tool attached to the first tool post is compared with that required for machining the work by one tool attached to the second tool post, and the tool attached to the second tool post is changed to machine the work during the machining of the work by one tool attached to the first tool post, when the time required for machining the work by one tool attached to the first tool post is longer.

For the numerically controlled lathe of the present invention, even when the machining time of the work by the tool on the second tool post is shorter than that of the work by the tool on the first tool post, the machining of the work by the tool on the second tool post can be continued regardless of the machining of the work by the tool on the first tool post. Therefore, the waste of time is reduced, and the machining efficiency can be enhanced.

In present invention, when the machining of the work by the second tool post is completely ended, the work held by the first main shaft may simultaneously be machined with the tools attached to the first and second tool posts.

In this case, a standby time of the second tool post is eliminated, the second tool post can effectively be used, and there is an advantage that the machining time can further be reduced.

In the present invention, a time required for machining the work by one tool attached to the first tool post is compared with that required for machining the work by one tool attached to the second tool post, and the tool attached to the first tool post is changed to machine the work during the machining of the work by one tool attached to the second tool post, when the time required for machining the work by one tool attached to the second tool post is longer.

Also in this case, the waste of time is reduced, and the machining efficiency can be enhanced.

In the invention according to the eighth aspect, the machining of the work by the tool attached to the second tool post or that of the work by the tool attached to the first tool post is started behind a machining start timing of the work by the tool attached to the first tool post or that of the work by the tool attached to the second tool post.

In this constitution, the amount of the movement of the first or second tool post during the machining of the work can be minimized, and the numerically controlled lathe can further be miniaturized.

In the present invention, the second tool post is disposed on a headstock which rotatably supports the first main shaft.

In this case, a space above one headstock is used to disposed the second tool post, and the space of the numerically controlled lathe can be saved.

In the present invention, there is provided a method of machining a work using a numerically controlled lathe. A uniaxial or biaxial movement required for the second tool post to machine the work held by the second main shaft is superposed on that required for the first tool post to machine the work held by the first main shaft to move the second tool post. The machining of the work by the tool attached to the first tool post, and that of the work by the tool attached to the second tool post are simultaneously performed.

According to this method, a variety of machining operations can be effected on the works held by two main shafts with the tools attached to two tool posts.

In the present invention, when a time required for one tool attached to the first tool post to machine the work is longer than that required for one tool attached to the second tool post to machine the work, during the machining operation performed on the work by one tool attached to the first tool post, the tool attached to the second tool post is changed to machine the work in the machining method. In this case, the work held by the first main shaft may simultaneously be machined with one tool attached to the first tool post and that attached to the second tool post.

In the present invention, when the time required for one tool attached to the second tool post to machine the work is longer than that required for one tool attached to the first tool post to machine the work, during the machining operation performed on the work by one tool attached to the second tool post, the tool attached to the first tool post is changed to machine the work in the machining method.

According to the method described in the present invention, it is possible to largely reduce the waste of the machining time.

In the present invention, the machining of the work by the tool attached to the second tool post or that of the work by the tool attached to the first tool post is started behind a machining start timing of the work by the tool attached to the first tool post or that of the work by the tool attached to the second tool post in the machining method.

According to this method, the amount of movement of the first or second tool post during the machining operation of the work can be minimized, and it is possible to further miniaturize the numerically controlled lathe.

In the present invention, the tool attached to the second tool post includes a tool for machining a hole inner peripheral surface or an outer peripheral surface of the work, and a cutting edge of the tool is directed in a direction crossing at right angles to a superposed movement direction of the second tool post with respect to the first tool post during the machining of the work in the method.

According to this method, even when a superposition error is generated, an influence of the superposition error onto a machining quality of the work can be minimized.

BEST MODE FOR CARRYING OUT THE INVENTION

Preferred embodiments of the present invention will hereinafter be described in detail with reference to the drawings.

First, a schematic constitution of an NC lathe of the present invention will be described with reference to FIGS. 1 to 3.

Figure 1:
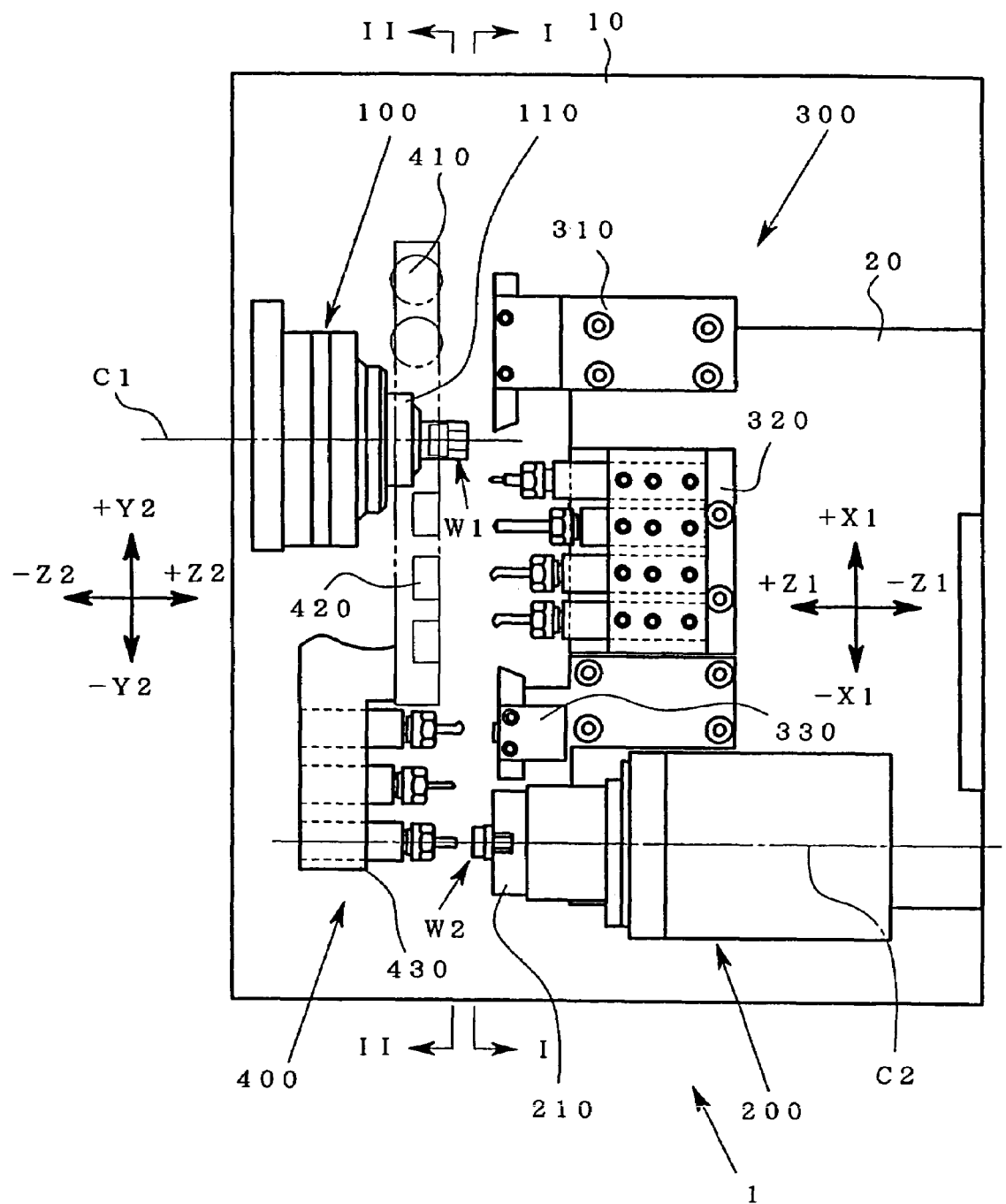
FIG. 1 is a schematic plan view showing a constitution of an NC lathe of the present invention.
Figure 2:
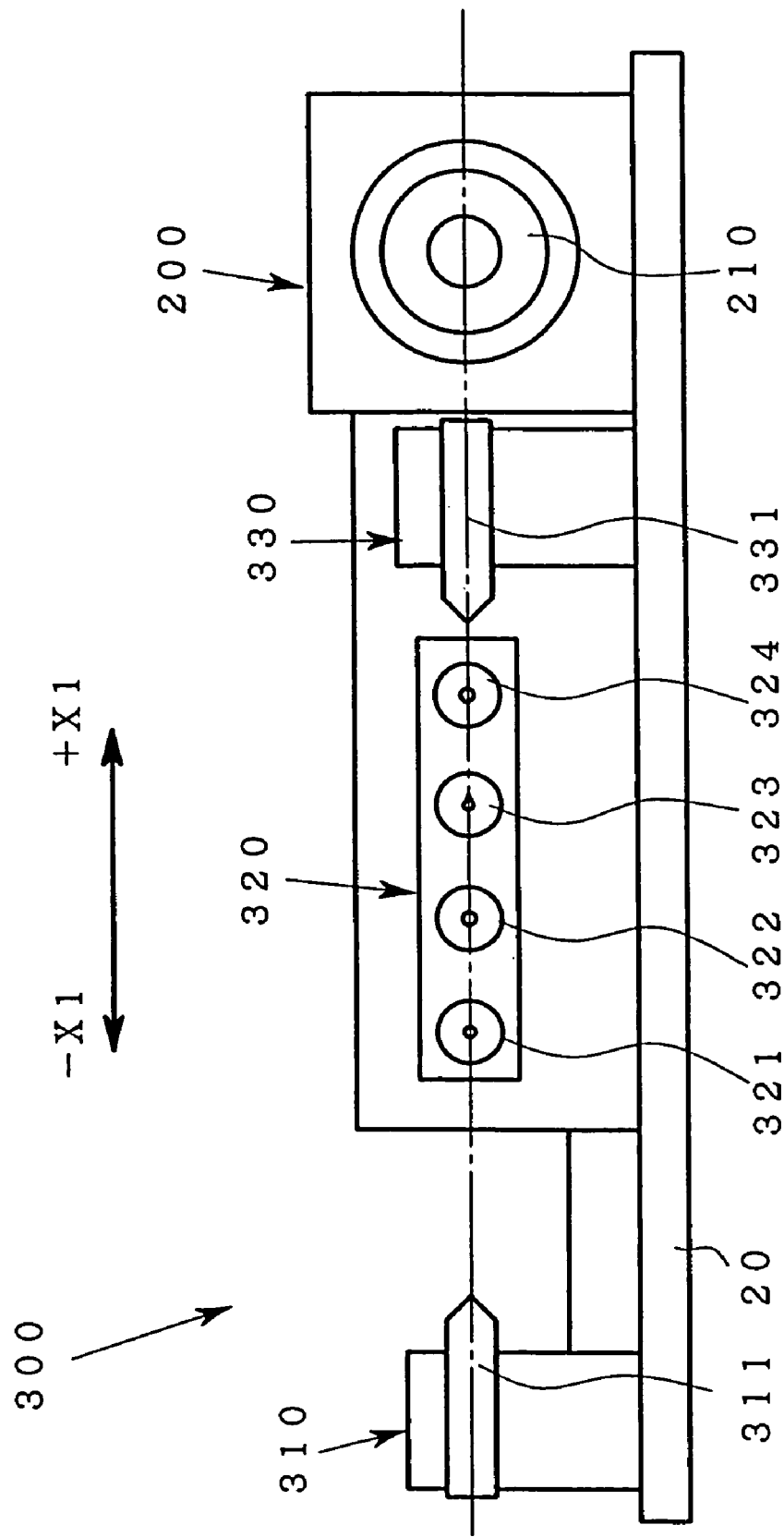
FIG. 2 is a schematic front view of a first tool post seen from a I-I direction of FIG. 1.
Figure 3:
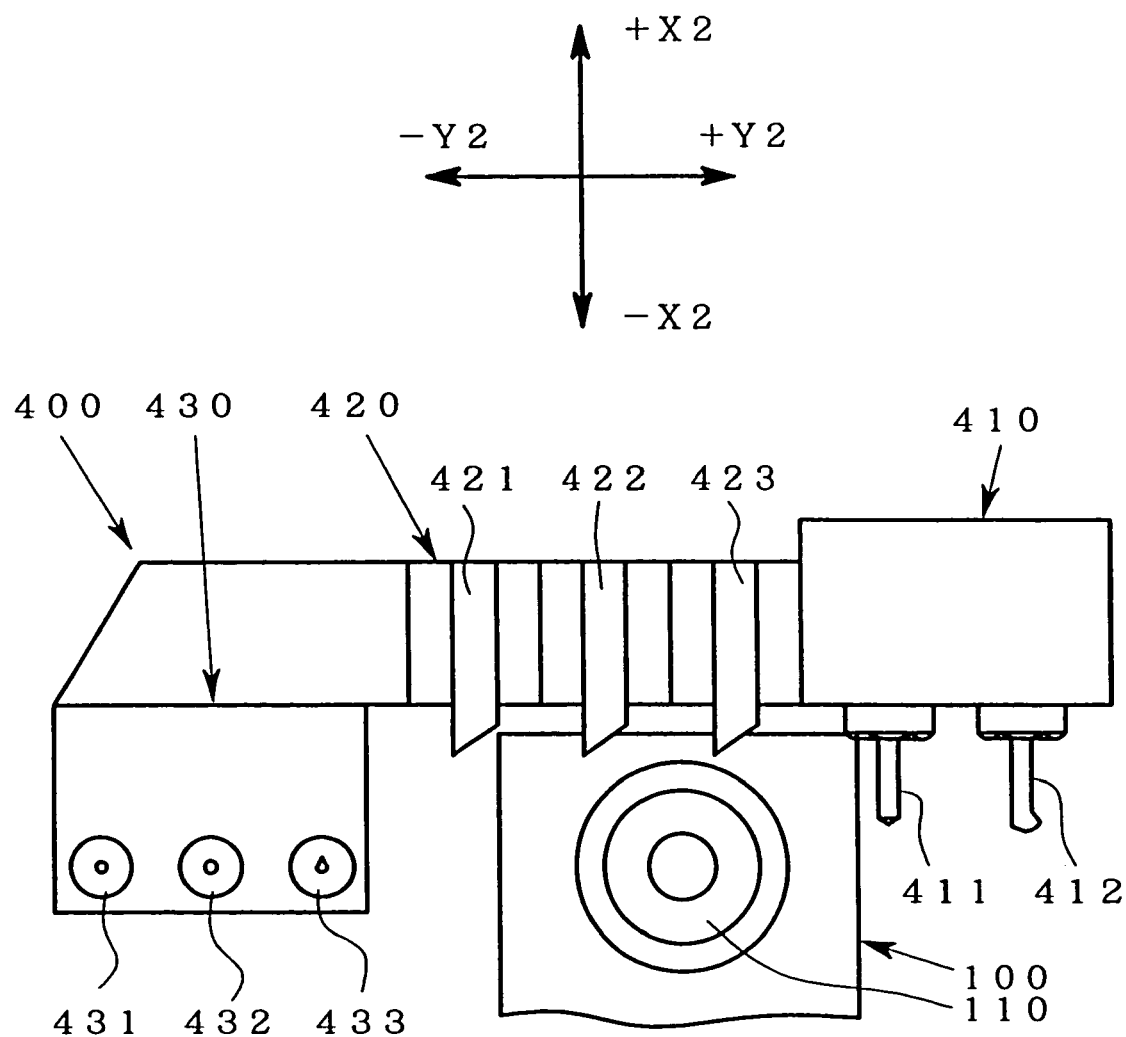
FIG. 3 is a schematic front view of a second tool post seen from a II-II direction of FIG. 1.

FIG. 1 is a plan view showing a schematic constitution of an embodiment of the NC lathe of the present invention, FIG. 2 is a front view of a second headstock and a first tool post of FIG. 1 seen from a I-I direction, and FIG. 3 is a front view of a first headstock and a second tool post of FIG. 1 seen from a II-II direction.

It is to be noted that in the following description, the same direction as that of a main shaft axis is defined as a Z-axis, a direction which crosses at right angles to this Z-axis and in which a work is cut with cutting machine tools such as a cutting tool is defined as an X-axis, and a direction which crosses at right angles to both the Z and X axes is defined as a Y-axis.

In a bed 10 of an NC lathe 1, a first headstock 100 is disposed opposite to a second headstock 200 in a state in which main shaft axes C1, C2 are eccentric. The first headstock 100 rotatably supports the a first main shaft 110, and the second headstock 200 rotatably supports a second main shaft 210. Chucks (not shown) are disposed on tip ends of the first main shaft 110 and second main shaft 210, respectively, so that works W1, W2 can be grasped with the chucks.

In this embodiment, the first headstock 100 is fixed to the bed 10 of the NC lathe 1. On the bed 10, a movable base 20 movable in a Z1-axis direction which is the same direction as that of the main shaft axis C1 and in an X1-axis direction crossing at right angles to this Z1-axis in a horizontal plane is disposed. Moreover, the second headstock 200 and first tool post 300 are arranged on the movable base 20.

Moreover, above the first headstock 100, a second tool post 400 movable in a Z2-axis direction which is the same direction as that of the main shaft axis C1, in a Y2-axis direction crossing at right angles to this, Z2-axis in the horizontal plane, and along the X2-axis crossing at right angles to the Z2-axis and Y2-axis is disposed.

The first tool post 300 includes: a cutting tool attaching section 310 to which a cutting tool 311 for cutting the work W1 held by the first main shaft 110 is attached; a rotary tool attaching section 320 to which rotary tools 321 to 324 for effecting a drilling operation of the work W1 are attached; and a cutting tool attaching section 330 to which a cutting tool 331 for cutting the work W1 is attached.

On the cutting tool attaching sections 310, 330, the cutting tools 311, 331 are disposed opposite to each other so as to allow cutting edges to abut on the work W1 on opposite sides of the X1-axis direction crossing at right angles to the main shaft axis C1.

The rotary tools 321 to 324 are attached to the rotary tool attaching section 320 so as to have the axis in the same direction as that of the main shaft axis C1. The rotary tools 321 to 324 move together with the first tool post 300, and the cutting edges abut on an end surface of the work W1 from the Z1-axis direction.

For the above-described tools attached to the first tool post 300, the tools are attached to the first tool post 300 at intervals determined beforehand in consideration of a movement distance of the first tool post 300 required for machining the work W1 so that during the machining of the work W1 by one tool (e.g., the cutting tool 311), another tool disposed adjacent to the tool (e.g., the rotary tool 321) does not interfere with the work W1 and the first main shaft 110.

Moreover, since the first tool post 300 of this embodiment does not move in the Y1-axis direction, the respective tools 311, 321, 322, 323, 324, 331 are attached to the first tool post 300 so that the cutting edges have the same height as that of the main shaft axis C1 of the first main shaft 110 as shown in FIG. 2.

For the first tool post 300, by linear movement of the movable base 20 in the X1-axis direction, any one tool among the cutting tools 311, 331, and rotary tools 321 to 324 is indexed in a machining position of the work W1. Moreover, by a combination of the movements of the first tool post 300 in the X1-axis and Z1-axis directions, the work W1 is machined.

Mainly a tool for machining the work W2 held by the second main shaft 210 is attached to the second tool post 400. Concretely, the second tool post includes: a rotary tool attaching section 410 to which rotary tools 411, 412 for effecting the drilling operation of the outer peripheral surface of the work W2 are attached; a cutting tool attaching section 420 to which cutting tools 421 to 423 for cutting the work W2 are attached; and a rotary tool attaching section 430 to which rotary tools 431 to 433 for effecting the drilling operation of the end surface of the work W2 are attached.

The rotary tools 411, 412 having a rotation axis in a direction crossing at right angles to the main shaft axis C2 are attached to the rotary tool attaching section 410. The rotary tools 411, 412 are rotatable by a motor to effect the machining while allowing the cutting edges to abut on the outer peripheral surface of the work W2 in a stopped state from the X2-axis direction.

The cutting tools 421, 422, 423 are attached to the cutting tool attaching section 420 so that the cutting edges abut on the outer peripheral surface of the work W2 from the X2-axis direction crossing at right angles to the main shaft axis C2.

The rotary tools 431, 432, 433 having the axes in the same direction as that of the main shaft axis C2 are attached to the rotary tool attaching section 430. The rotary tools 431, 432, 433 effect the machining while allowing the cutting edges to abut on the rotating work W2.

The rotary tools 431, 432, 433 are attached to the rotary tool attaching section 430 so that the heights of the cutting edges are positioned to be lower than those of the cutting edges of the cutting tools 421, 422, 423 attached to the cutting tool attaching section 420 in the X2-axis direction. This avoids interference of the cutting tools 421, 422, 423 with the work W1 held by the first main shaft 110 and with the cutting tools 311, 321, 322, 323, 324, 331 of the first tool post 300, when the work W2 held by the second main shaft 210 is machined with any one of the rotary tools 431, 432, 433.

Moreover, for the above-described tools attached to the second tool post 400, the tools are attached to the second tool post 400 at the intervals determined beforehand in consideration of the movement distance of the second tool post 400 required for machining the work W2 so that during the machining of the work W2 by one tool (e.g., the rotary tool 431), another tool disposed adjacent to the tool (e.g., the rotary tool 432) does not interfere with the work W2 and the second main shaft 210.

For the second tool post 400, by the linear movement in the Y2-axis direction and/or the X2-axis direction, any one tool among the rotary tools 411, 412, the cutting tools 421, 422, 423, and the rotary tools 431, 432, 433 is indexed in the machining position of the work W2. Moreover, by the combination of the movements in the Y2-axis, Z2-axis, and X2-axis directions, the work W2 is machined.

For the tool attached to the second tool post 400, by the movement obtained by superposing the movement in the Y2-axis direction and/or the Z2-axis direction for machining the work W2 on the movement in the X1-axis direction and/or the Z1-axis direction of the first tool post 300, the tool is positioned with respect to the work W2 to effect the machining. A control device for controlling this superposition will hereinafter be described.

[Description of Control Device]

Figure 4:
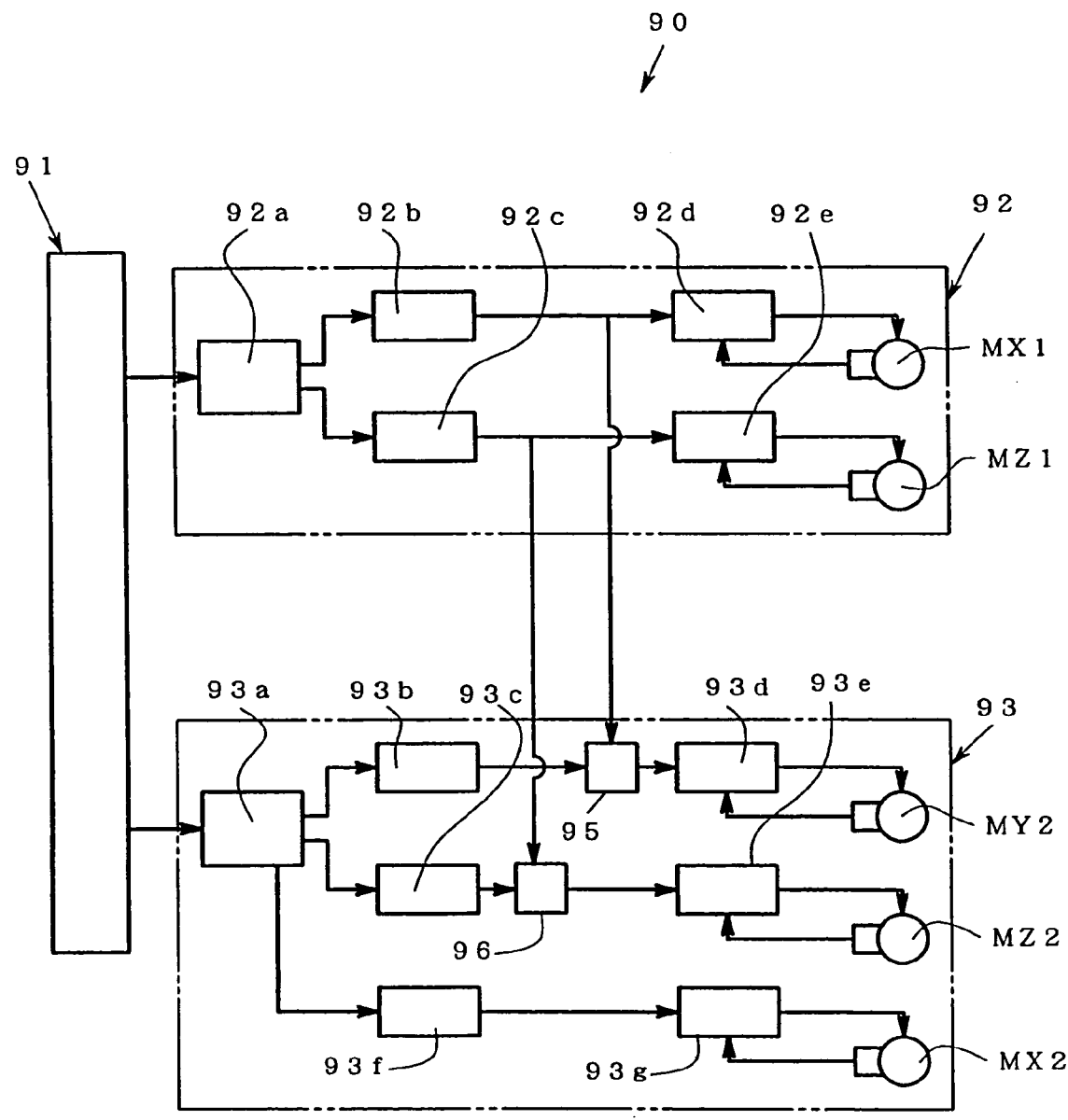
FIG. 4 is a block diagram showing a constitution of a control device disposed in the NC lathe according to one embodiment of the present invention.

FIG. 4 shows a control block diagram of the control device in this NC lathe 1.

A control device 90 includes: a central processing unit (CPU) 91; a first control system 92 for controlling the movement of the first tool post 300 in the Z1-axis and X1-axis directions in accordance with a command from this CPU 91; and a second control system 93 for controlling the movement of the second tool post 400 in the Z2-axis, X2-axis, and Y2-axis directions in accordance with the command from this CPU 91.

The first control system 92 includes: a first operation circuit 92a for moving the first tool post 300; speed processing circuits 92b, 92c for outputting speed signals of the X1-axis and Z1-axis directions based on an output signal from this first operation circuit 92a; and serve processing circuits 92d, 92e for driving servo motors MX1, MZ1 so as to move the first tool post 300 in the X1-axis and Z1-axis directions at a predetermined speed based on the output signals from the speed processing circuits 92b, 92c.

Similarly, the second control system 93 also includes: a first operation circuit 93a; speed processing circuits 93b, 93c, 93f for outputting the speed signals of the Y2-axis, Z2-axis, and X2-axis directions based on the output signal from this first operation circuit 93a; and serve processing circuits 93d, 93e, 93g for driving servo motors MY2, MZ2, MX2 so as to move the second tool post 400 in the Y2-axis, Z2-axis, and X2-axis directions at the predetermined speed based on the output signals from the speed processing circuits 93b, 93c, 93f.

In the second control system 93, superposition circuits 95, 96 are disposed between the speed processing circuits 93b, 93c and the serve processing circuits 93d, 93e.

The superposition circuit 95 superposes the movement of the first tool post 300 in the X1-axis direction on that of the second tool post 400 in the Y2-axis direction required for machining the work W2, and outputs the result to the serve processing circuit 93d as the movement of the second tool post 400 in the Y2-axis direction.

The superposition circuit 96 superposes the movement of the first tool post 300 in the Z4-axis direction on that of the second tool post 400 in the Z2-axis direction required for machining the work W2, and outputs the result to the serve processing circuit 93e as the movement of the second tool post 400 in the Z2-axis direction.

It is to be noted that the "movement" to be superposed by the superposition circuits 95, 96 includes a feed speed or feed amount.

Figure 5:
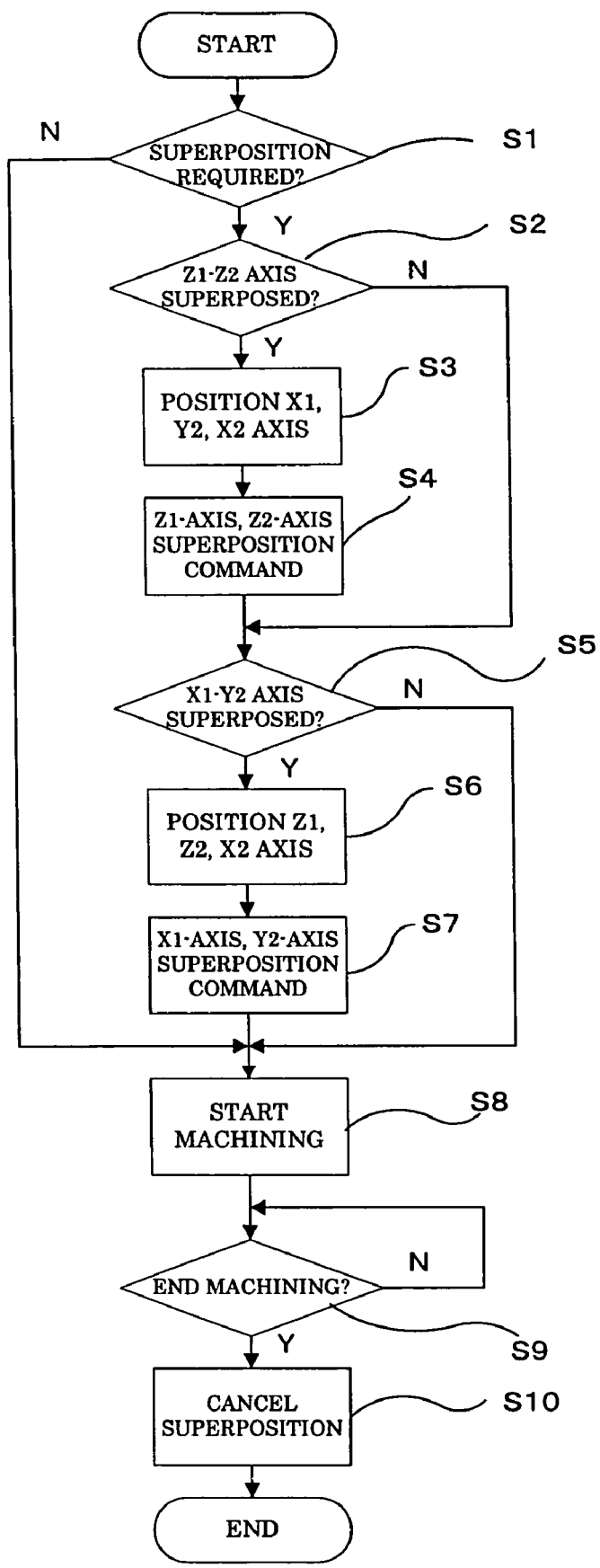
FIG. 5 is a flowchart showing a procedure of superposition according to the control device of FIG. 4.

FIG. 5 is a flowchart showing a procedure of superposition according to the control device 90 of FIG. 4.

The CPU 91 judges whether or not there is a necessity for superposition based on an NC machining program for machining the works W1 and W2 (step S1). When the superposition is not necessary, that is, when the machining of the work W1 is performed separately from that of the work W2 with independent NC machining programs, in accordance with the respective NC machining programs, the machining of the work W1 by the tools 311, 321 to 324, 331 of the first tool post 300 and that of the work W2 by the tools 411, 412, 421 to 423, 431 to 433 of the second tool post 400 are effected (step S8).

When the superposition is necessary, that is, when the machining of the work W1 is performed simultaneously with that of the work W2, it is judged whether the axes to be superposed are Z1-Z2 axes or X1-Y2 axes (steps S2, S5).

When the axes to be superposed are Z1-Z2 axes, after positioning the X1-axis, X2-axis, and Y2-axis (step S3), the Z1-axis is superposed on the Z2-axis (step S4).

When the axes to be superposed are X1-Y2 axes, after positioning the Z1-axis, Z2-axis, and X2-axis (step S6), the X1-axis is superposed on the Y2-axis (step S7).

When their preparations for the superposition are completed, in accordance with the NC machining program, the machining of the work W1 by the tools 311, 321 to 324, 331 of the first tool post 300 and that of the work W2 by the tools 411, 412, 421 to 423, 431 to 433 of the second tool post 400 are simultaneously effected (step S8)

When the machining ends (step S9), the superposition is canceled (step S10).

Next, an embodiment of the method of machining the work by the NC lathe constituted as described above will be described with reference to FIGS. 6 to 10.

FIRST EMBODIMENT OF MACHINING METHOD

Figure 6:
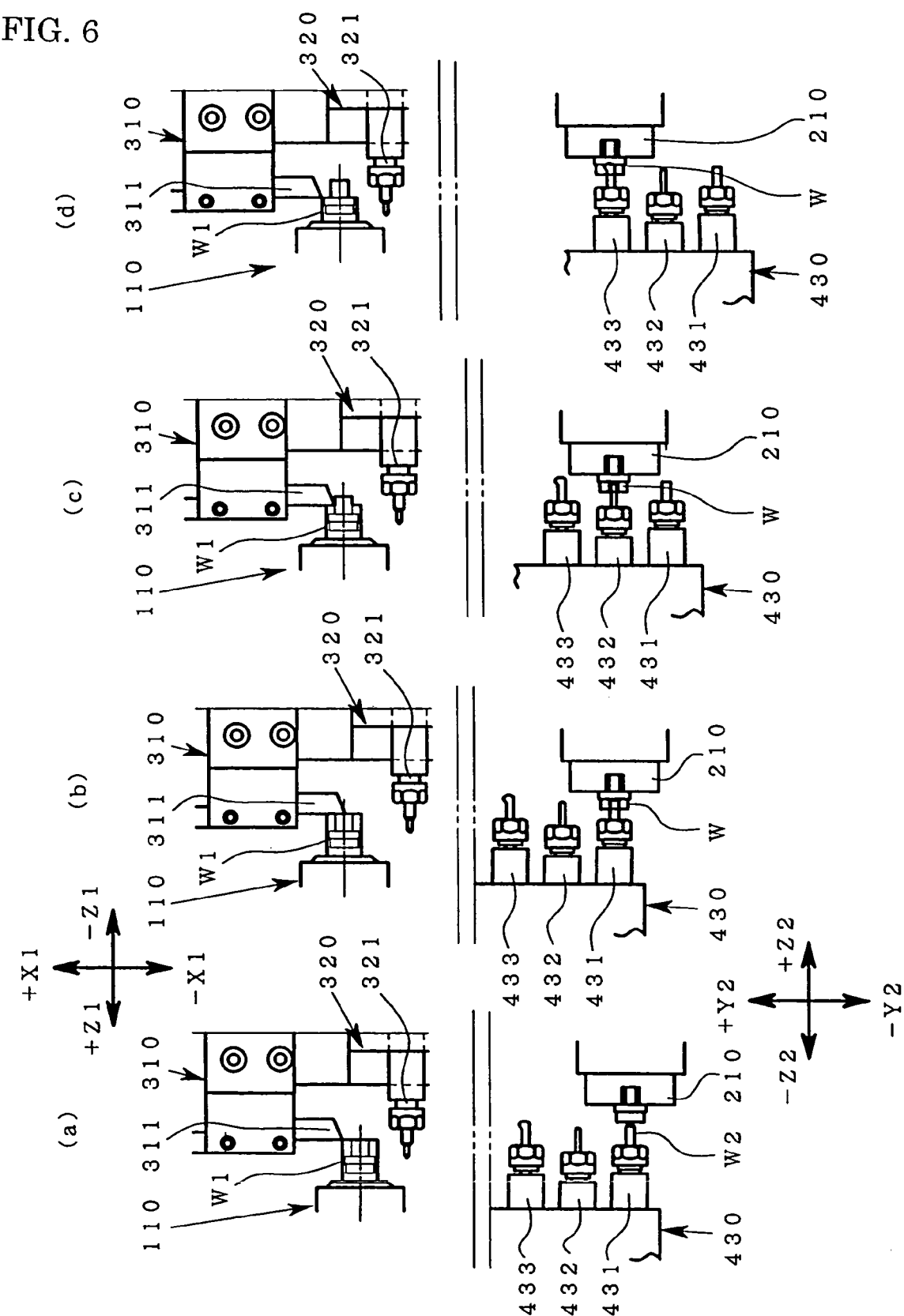
FIG. 6 is a diagram showing a first embodiment of a method of machining a work by the NC lathe of the present invention.

FIG. 6 is a diagram showing a first embodiment of the method of machining the work by the NC lathe 1 constituted as described above.

The machining method of the present invention is realized by a mechanical constitution of the NC lathe 1 in which although the first tool post 300 moves integrally with the second main shaft 210, the second tool post 400 is movable in the Z2-axis direction in addition to the Y2-axis and X2-axis directions. Moreover, a degree of freedom is increased in preparing the machining program inputted beforehand into the control device which controls the operation of the NC lathe 1 by the above-described mechanical constitution.

To prepare the machining program for use in the machining method of this embodiment, a time required for machining the work W2 by the rotary tool 431 attached to the second tool post 400 and that required for machining the work W1 by the cutting tool 311 attached to the first tool post 300 are obtained and compared with each other. For example, when the time required for machining the work W2 by the rotary tool 431 is judged to be shorter than that required for machining the work W1 by the cutting tool 311, the machining program is preferably prepared so as to successively switch the rotary tools 431 to 433 attached to the second tool post 400 and to machine the work W2 during the machining of the work W1 by the cutting tool 311.

In the machining method of this embodiment shown in FIG. 6, the machining is performed as shown in FIGS. 6(a) to (d) based on the command from the control device into which the machining program has been inputted.

As shown in FIG. 6(a), by the movement of the movable base 20 in the X1-axis and Z1-axis directions, the cutting tool 311 is indexed together with the first tool post 300 in the machining position in an end outer peripheral edge of the work W1.

Simultaneously, in addition to the movement of the second tool post 400 in the Y2-axis direction superposed/operated on the movement in the X1-axis direction, and that of the second tool post 400 in the Z2-axis direction superposed/operated on the movement in the Z1-axis direction, by the movement of the second tool post 400 in the X2-axis direction, the rotary tool 431 is indexed in the machining position in an end surface center of the work W2.

Subsequently, as shown in FIG. 6(b), together with the movable base 20, the first tool post 300 is fed in a −X1-axis direction to machine the end surface of the work W1. Simultaneously, while the second tool post 400 is fed in a −Y2-axis direction at the same feed speed as that of the first tool post 300 in the −X1-axis direction, and fed in a +Z2-axis direction at a predetermined feed speed, the drilling operation is performed on the axis of the work W2.

As shown in FIG. 6(c), the cutting tool 311 which has machined the end surface of the work W1 moves in the +X1-axis direction so as to machine the outer peripheral surface of the work W1. During this, the second tool post 400 moves in a −Z2-axis direction from the state shown in FIG. 6(b), and next moves in the −Y2-axis direction. Accordingly, the rotary tool 432 is indexed in the machining position of the work W2. Moreover, simultaneously with the machining of the outer peripheral surface of the work W1 by the cutting tool 311, the drilling operation of the work W2 is performed by the rotary tool 432. In this case, the feed speed in the Z2-axis direction required for machining the work W2 is superposed on that of the first tool post 300 in the Z1-axis direction, further the movement of the Y2-axis direction is superposed on that of the X1-axis direction, and the drilling operation of the work W2 is performed with the rotary tool 432.

Furthermore, after the end of the drilling operation of the work W2 by the rotary tool 432, the second tool post 400 moves in the −Z2-axis direction from the state shown in FIG. 6(c), and next moves in the −Y2-axis direction. Accordingly, the rotary tool 433 is indexed in the machining position of the work W2. Moreover, the rotary tool 433 is inserted in a hole made by the rotary tools 431, 432, and a boring operation is performed simultaneously with the machining of the outer peripheral surface of the work W1 by the cutting tool 311.

Also in this case, the feed speed of the Z2-axis direction required for machining the work W2 is superposed on that of the Z1-axis direction of the first tool post 300, further the movement of the Y2-axis direction is superposed on that of the X1-axis direction, and the drilling operation of the work W2 is performed with the rotary tool 433.

As shown in FIG. 6(d), when the cutting tool 311 reaches a predetermined dimension from the end surface of the work W1, the first tool post 300 moves in the +X1-axis direction to detach the cutting tool 311 from the work W1, and the machining of the work W1 by the cutting tool 311 ends. When the boring operation by the rotary tool 433 ends, the second tool post 400 moves to detach the rotary tool 433 from the work W2.

As described above, the machining of the works W1, W2 ends.

It is to be noted that although not especially shown or described in detail, the time required for machining the work W1 by the tool (e.g., the cutting tool 311) attached to the first tool post 300 is shorter than that required for machining the work W2 by the rotary tool 431 attached to the second tool post 400. In this case, in the same manner as described above, the tools attached to the first tool post 300 can successively be changed to machine the work W1.

SECOND EMBODIMENT OF MACHINING METHOD

Figure 7:
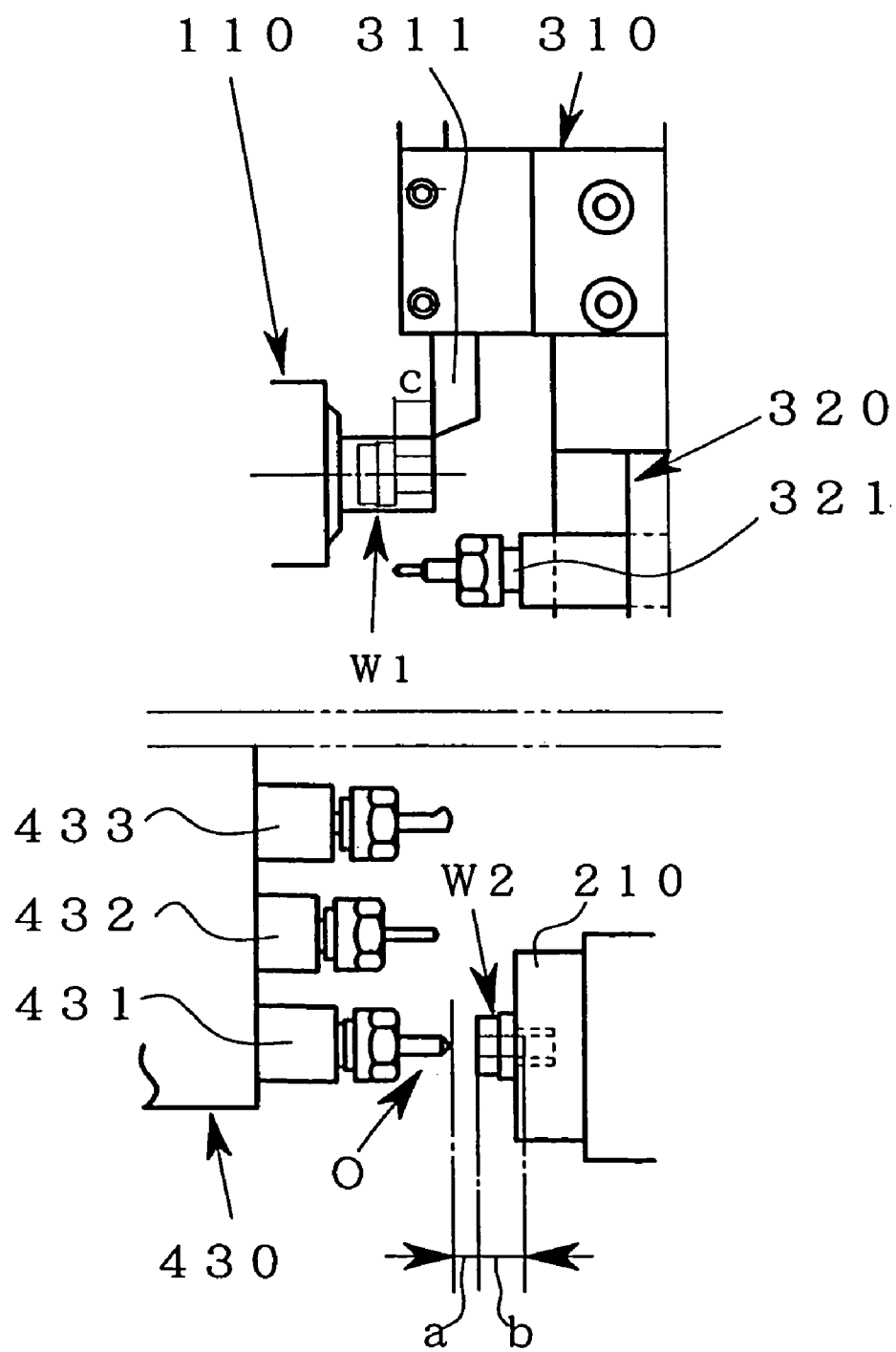
FIG. 7 is a diagram showing a second embodiment of the method of machining the work by the NC lathe of the present invention.

FIG. 7 is a diagram showing a second embodiment of the machining method of the present invention.

The second tool post 400 is positioned beforehand so that the cutting edge of the rotary tool 431 is brought in the machining position of the end surface of the work W2 held by the second main shaft 210, when the first tool post 300 moves by a distance a in the +Z1-axis direction after starting the machining of the work W1 by the cutting tool 311 of the first tool post 300. Moreover, in the same manner as in the above-described embodiment, the movement of the second tool post 400 in the +Z2-axis direction for machining the work W2 by the rotary tool 431 is superposed on that of the first tool post 300 in the +Z1-axis direction for machining the work W1 by the cutting tool 311. While the second tool post 400 is moved in the +Z2-axis or −Z2-axis direction, the work W2 is machined with the rotary tool 431.

According to this embodiment, the amount of the movement of the second tool post 400 in the +Z2-axis direction can be saved by the distance a, and there is an advantage that the NC lathe 1 can accordingly be miniaturized.

That is, in the state shown in FIG. 7, the distance of the +Z2-axis direction in which the second tool post 400 has to move so as to machine the work W2 by the rotary tool 431 is a+b−c (b denotes a machining length of the work W2 by the rotary tool 431, c denotes a machining length of the work W1 by the cutting tool 311). However, when a=0 is set, a stroke of the second tool post 400 in the +Z2-axis direction can accordingly be reduced.

THIRD EMBODIMENT OF MACHINING METHOD

Figure 8:
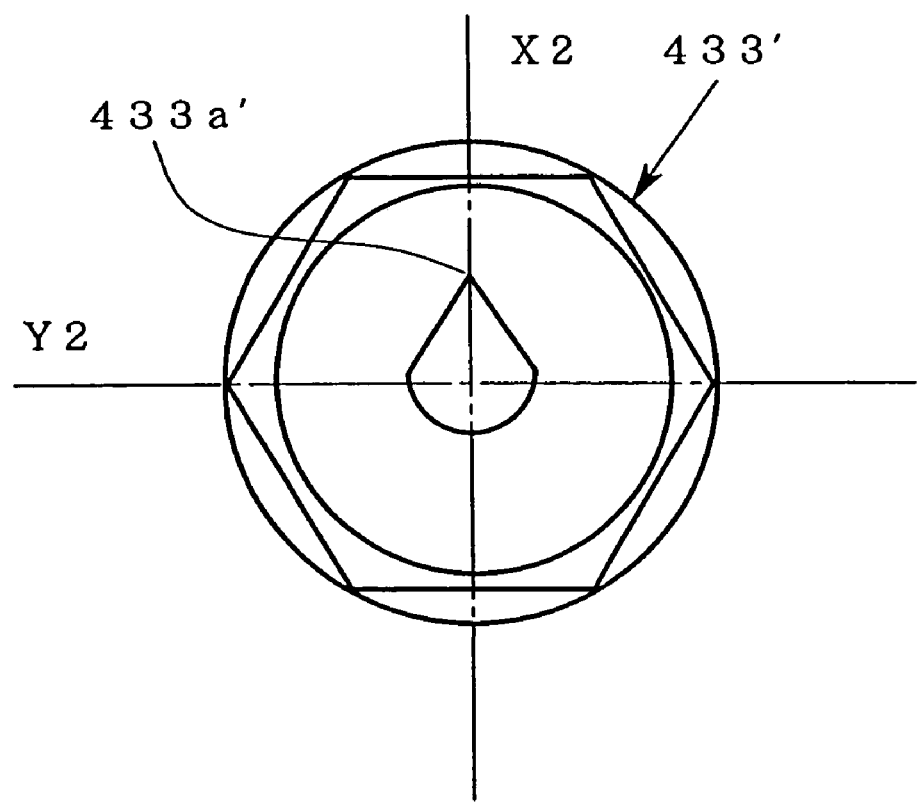
FIG. 8 is a front view of a bore cutting tool seen from the II-II direction of FIG. 1 in a case where the bore cutting tool is attached to a rotary tool attaching section of the second tool post according to a third embodiment of the method of machining the work by the NC lathe of the present invention.
Figure 9:
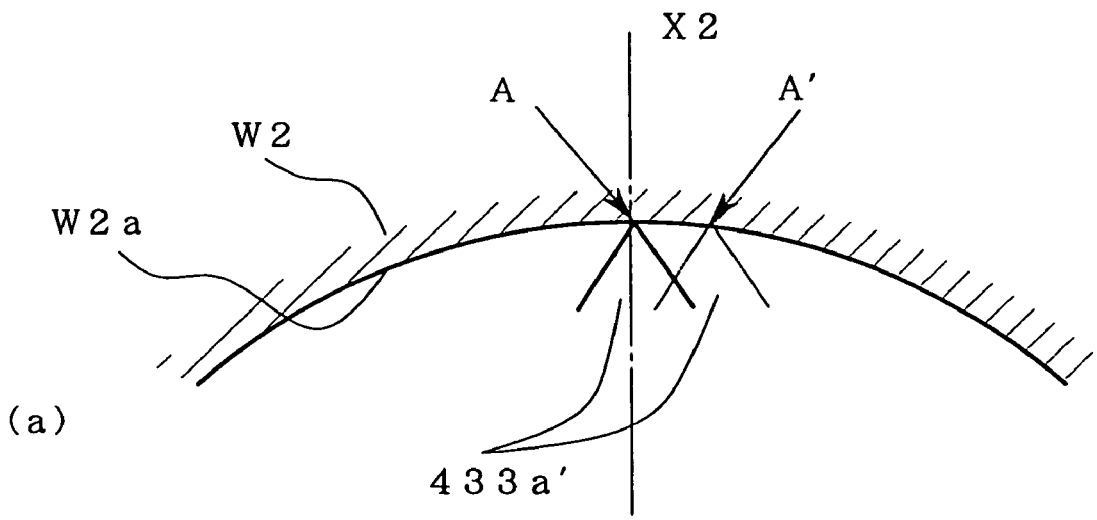
FIG. 9(a) is a partial enlarged view of FIG. 8 showing a function of the bore cutting tool attached as shown in FIG. 8.
FIG. 9(b) is a partial enlarged view of FIG. 8 for comparison with FIG. 9(a)
Figure 9:
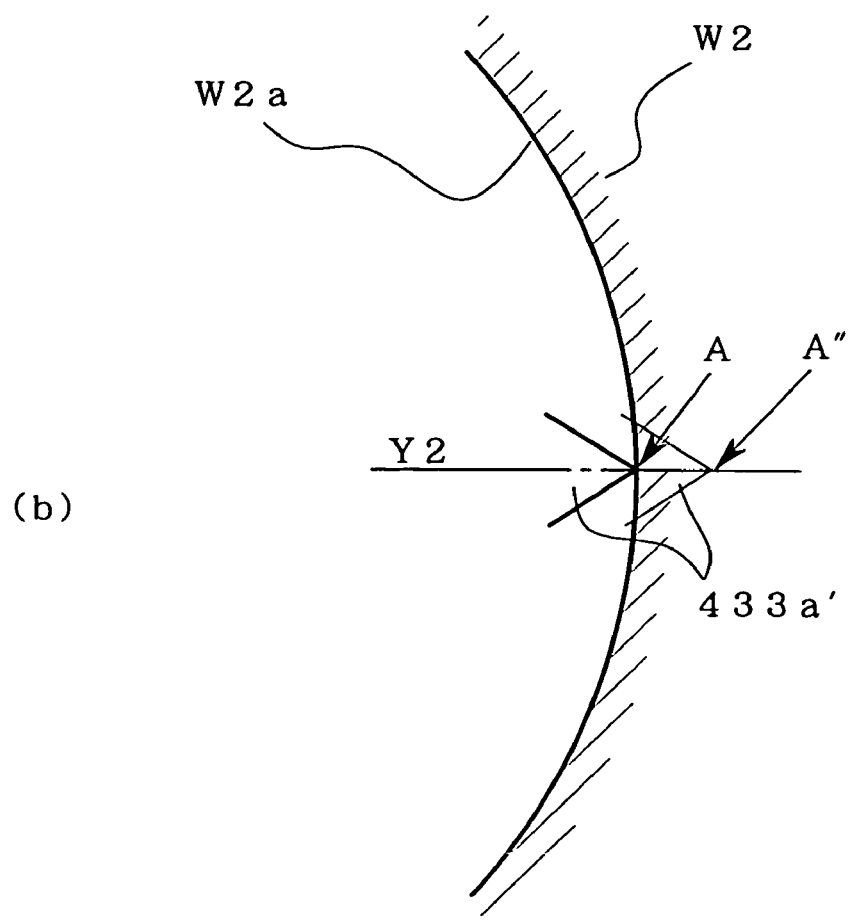

FIGS. 8 and 9 are explanatory views of a most preferable machining method in a case where a bore cutting tool 433' for effecting a bore machining operation with respect to the work W2 is attached instead of the rotary tool 433 of the second tool post 400 to effect the machining operation.

FIG. 8 is a front view of the bore cutting tool 433' seen from II-II direction of FIG. 1 in the case where the bore cutting tool 433' is attached to the rotary tool attaching section 430 of the second tool post 400. The bore cutting tool 433' shown in FIG. 8 is used to perform the superposition and the machining operation between the X1-axis of the first tool post 300 and the Y2-axis of the second tool post 400. In this case, it is most preferable to direct a cutting edge 433a' of the bore cutting tool 433' as shown in FIG. 8.

A function of the bore cutting tool 433' attached as shown in FIG. 8 will be described with reference to FIGS. 9(a)(b).

FIG. 9(a) is a partial enlarged view of FIG. 8 to show the function. When the bore cutting tool 433' is used to perform the machining operation, the cutting edge 433a' of the bore cutting tool 433' is directed and fixed in a direction (X2-axis direction) crossing at right angles to a superposed movement direction between the X1-axis of the first tool post 300 and the Y2-axis of the second tool post 400. FIG. 9(b) is a diagram for comparison with FIG. 9(a), and is a partial enlarged view of FIG. 8 to show the function. When the bore cutting tool 433' is used to perform the machining operation, the cutting edge 433a' of the bore cutting tool 433' is directed and fixed in the same direction (Y2-axis direction) as the superposed movement direction between the X1-axis of the first tool post 300 and the Y2-axis of the second tool post 400.

The bore cutting tool 433' effects the boring operation of the hole formed in the work W2 by the rotary tools 431, 432 (see FIG. 3). To cut a hole inner peripheral surface W2a, the cutting edge 433a' abuts on the hole inner peripheral surface W2a at an abutment point A, and the surface is cut in the same direction as that of an axis (the X2-axis in the example of FIG. 9(a)) extending through the abutment point A and a center axis of the bore cutting tool 433'.

In this embodiment, the axis for effecting the superposition is selected in the Y2-axis and Z2-axis crossing at right angles to the X2-axis. When the superposition axis is selected in this manner, as shown in FIG. 9(a), a superposition error is generated in the Y2-axis direction. Even with the movement of the abutment point A at which the cutting edge 433a' abuts on the hole inner peripheral surface W2a to a position of a point A', an influence of this superposition error on a cut amount of the cutting edge 433a' with respect to the hole inner peripheral surface W2a is remarkably little.

That is, as shown in FIG. 9(b), the cutting edge 433a' of the bore cutting tool 433' is directed in the Y2-axis which is the same direction as the superposed movement direction. In this case, when the superposition error is generated and the abutment point A moves to a position of A", the cut amount of the cutting edge 433a' changes by a dimension substantially equal to a movement distance of A→A", a great deal of adverse influence is given onto the machined work. On the other hand, as shown in FIG. 9(a), the cutting edge 433a' is directed in the X2-axis direction crossing at right angles to the direction of the superposed movement of the bore cutting tool 433'. Then, the change of the cut amount can be remarkably reduced as compared with the superposition error.

FOURTH EMBODIMENT OF MACHINING METHOD

Figure 10:
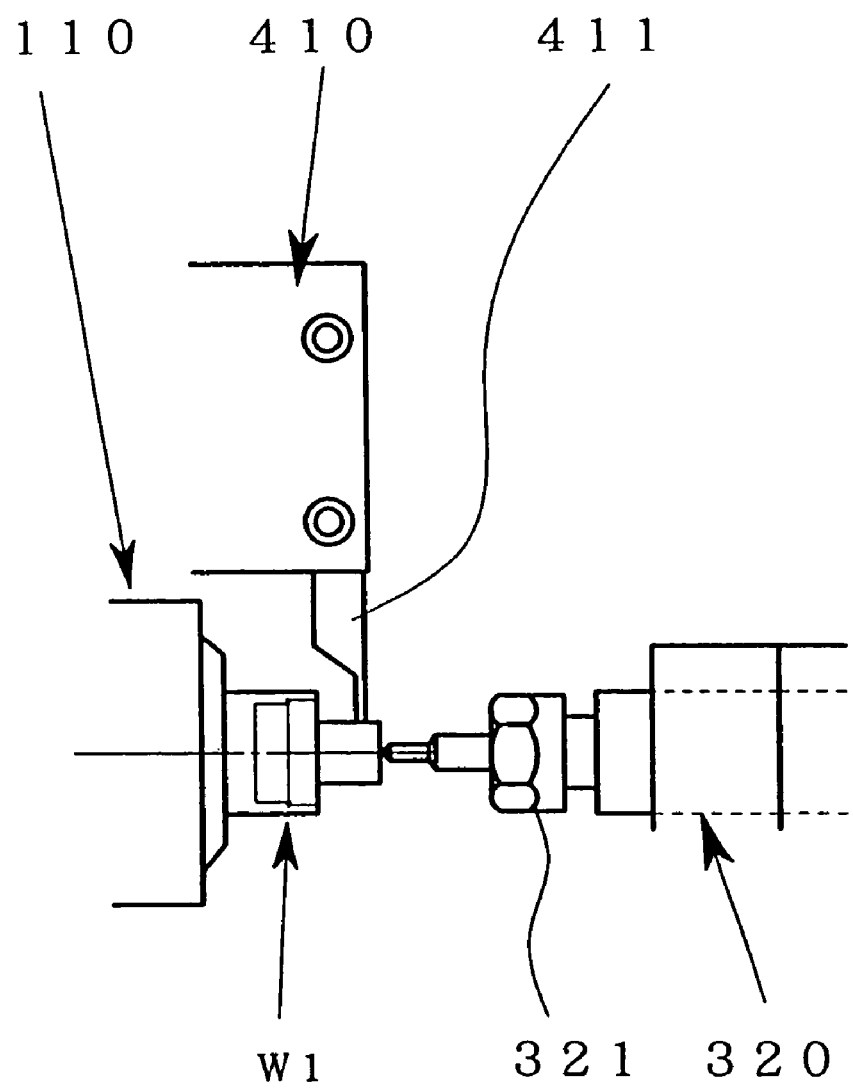
FIG. 10 is an explanatory view of a fourth embodiment of the method of machining the work by the NC lathe of the present invention.
Figure 11:
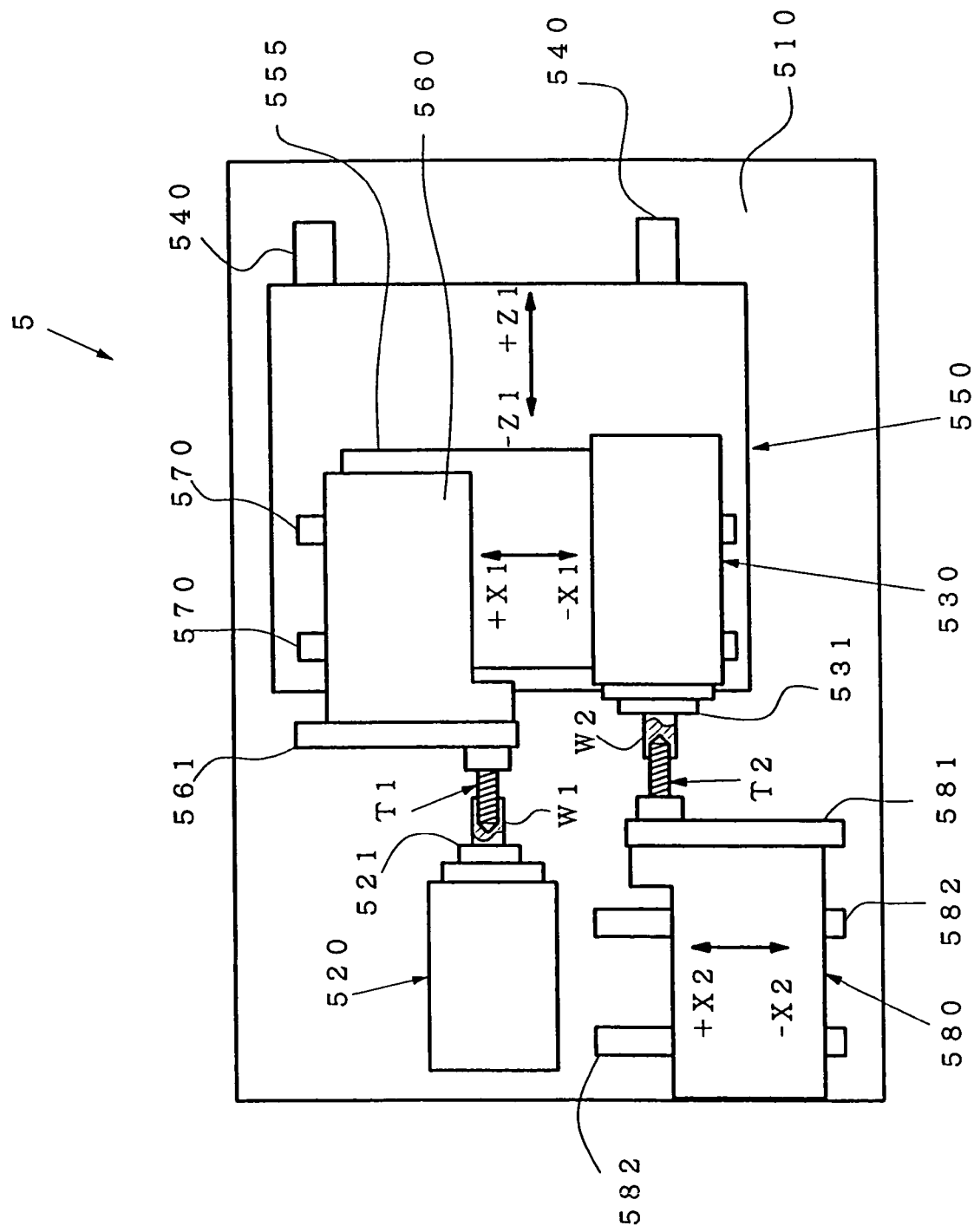
FIG. 11 is a plan view showing a schematic constitution of the NC lathe according to a conventional example of the present invention.

FIG. 10 is a diagram showing a fourth embodiment of the machining method of the present invention.

For the NC lathe 1 of the present invention, since the second tool post 400 is movable in a triaxial direction of the X2-axis, Y2-axis, and Z2-axis, the work W1 held by the first main shaft 110 can be machined with the tool attached to the second tool post 400.

A time required until all the machining operations of the work W2 by the tool of the second tool post 400 is considerably shorter than that required until all the machining operations of the work W1 by the tool of the first tool post 300. In this case, for example, as shown in FIG. 10, it is possible to simultaneously perform the machining (end surface drilling operation) of the work W1 by the rotary tool 321 of the first tool post 300 and the machining (groove forming operation of the outer peripheral surface) of the work W1 by the cutting tool 421 of the second tool post 400.

In this manner, the second tool post 400 can effectively be used to machine the work W1 simultaneously with the tools of the first tool post 300 and second tool post 400.

The preferable embodiments of the present invention have been described, but the present invention is not limited to the above-described embodiments, For example, the number and type of the tool to be attached to the first tool post 300 and second tool post 400 are not limited as described above, and it is possible to attach a larger number of a variety of tools.

Moreover, the relative rotation of the works W1, W2 with respect to the rotary tools such as drills attached to the first tool post 300 and second tool post 400 has been described by the rotation of the first main shaft 110 or the second main shaft 210. However, it is also possible to dispose a rotation driving mechanism for rotating the tools on the first tool post 300 and second tool post 400 and to rotate the rotary tools such as the drills attached to the first tool post 300 and second tool post 400. In this constitution, other rotary tools such as end mills can be attached to the first tool post 300 and second tool post 400 to perform the machining operations such as a key groove cutting operation, and versatility of the machining operation by the NC lathe can further be enhanced.

Furthermore, in the above-described embodiment, the superposition circuits 95, 96 are disposed between the speed processing circuits 93b, 93c and the serve processing circuits 93d, 93e of the second control system 93, and the superposition circuits 95, 96 are allowed to perform the operation for the superposition, but the operation for the superposition may also be performed by the CPU 91.

According to the present invention, a plurality of different machining positions by a plurality of tools can simultaneously be performed with respect to the works on one and the other main shaft sides.

Moreover, the machining time of the work on one main shaft side and that of the work on the other main shaft side are obtained. The tools are successively changed with respect to the work which has been machined early, while the machining can be continued. The waste of time such as the waiting time can be prevented, and the machining efficiency can be enhanced by enhancement of an operation efficiency of the numerically controlled lathe or reduction of the machining time of the work.

Furthermore, according to the present invention, when the boring operation is performed, the superposition axis is selected in the direction crossing at right angles to the cut direction of the tool. Accordingly, the adverse influence of the superposition error on the machining quality can be minimized.

As described above, with respect to the works held by two main shafts, more various types of machining operations can simultaneously be performed, and the machining efficiency is also superior. Therefore, a price of the numerically controlled lathe and machining cost of the work by the numerically controlled lathe can largely be reduced.

INDUSTRIAL APPLICABILITY

The present invention can be applied to a numerically controlled lathe having either a comb teeth shape or a turret shape as long as the lathe includes two main shafts disposed opposite to each other, and two tool posts for machining works held by the respective main shafts. Moreover, tools attached to the tool posts are not limited to cutting machine tools such as various types of cutting tools and rotary tools such as drills, and can include all tools such as a tap, reamer, and milling cutter.

The invention claimed is:

1. A numerically controlled lathe comprising: first and second main shafts which are disposed opposite to each other and which are movable with respect to each other; first and second tool posts to which a plurality of tools are attached so as to machine works held by the first and second main shafts; and a control device which controls movements of the first and second main shafts and the first and second tool posts, wherein the first tool post is arranged integrally with the second main shaft, and is movable in a main shaft axial direction of the second main shaft and in an axial direction crossing at right angles to the main shaft axial direction in a plane, the second tool post is movable in a biaxial direction which is the same direction as that of the movement of the first tool post, and an axial direction crossing at right angles to the biaxial direction so that the second tool post moves in three directions, and when the work attached to the first main shaft is machined by the tool attached to the first tool post and the work attached to the second main shat is machined by the tool attached to the second tool post simultaneously, the control device superposes the uniaxial or biaxial movement required for the first tool post to machine the work on the uniaxial or biaxial movement required for the second tool post to machine the work, and outputs an instruction for movement to the first or second tool post, so that the machining operation of the work by the tool attached to the first tool post and that of the work by the tool attached to the second tool post are simultaneously effected.

2. The numerically controlled lathe according to claim 1, wherein the tools are linearly arranged and attached along the movement directions of the first and second tool posts, and the tool is indexed by the linear movements of the first and second tool posts in the uniaxial or biaxial direction.

3. The numerically controlled lathe according to claim 2, wherein an interval between the tools attached to the first or second tool post is determined based on an amount of the movement of the first or second tool post required for machining the work by one tool so as to minimize a distance between the tools such that the other tool disposed adjacent to this one tool does not interfere with the work or the first or second main shaft during the machining operation of the work by the one tool.

4. The numerically controlled lathe according to claim 1, wherein a time required for machining the work by one tool attached to the first tool post is compared with that required for machining the work by one tool attached to the second tool post, and the tool attached to the second tool post is changed to machine the work during the machining of the work by one tool attached to the first tool post, when the time required for machining the work by the one tool attached to the first tool post is longer.

5. The numerically controlled lathe according to claim 4, wherein the work held by the first main shaft is simultaneously machined with the tools attached to the first and second tool posts.

6. The numerically controlled lathe according to claim 1, wherein a time required for machining the work by one tool attached to the first tool post is compared with that required for machining the work by one tool attached to the second tool post, and the tool attached to the first tool post is changed to machine the work during the machining of the work by the one tool attached to the second tool post, when the time required for machining the work by the one tool attached to the second tool post is longer.

7. The numerically controlled lathe according to claim 1, wherein the machining of the work by the tool attached to the second tool post or that of the work by the tool attached to the first tool post is started behind a machining start timing of the work by the tool attached to the first tool post or that of the work by the tool attached to the second tool post.

8. The numerically controlled lathe according to claim 1, wherein the second tool post is disposed on a headstock which rotatably supports the first main shaft.

9. A method of machining a work using the numerically controlled lathe according to claim 1, comprising the steps of:

superposing a uniaxial or biaxial movement required for the second tool post to machine the work held by the second main shaft on that required for the first tool post to machine the work held by the first main shaft to move the second tool post; and simultaneously effecting the machining of the work by the tool attached to the first tool post, and that of the work by the tool attached to the second tool post.

10. The method of machining the work according to claim 9, further comprising the steps of: changing the tool attached to the second tool post to machine the work during the machining operation performed on the work by one tool attached to the first tool post, when a time required for one tool attached to the first tool post to machine the work is longer than that required for one tool attached to the second tool post to machine the work.

11. The method of machining the work according to claim 10, further comprising the steps of: machining the work held by the first main shaft simultaneously with one tool attached to the first tool post and that attached to the second tool post.

12. The method of machining the work according to claim 9, further comprising the steps of: changing the tool attached to the first tool post to machine the work during the machining operation performed on the work by one tool attached to the second tool post, when the time required for one tool attached to the second tool post to machine the work is longer than that required for one tool attached to the first tool post to machine the work.

13. The method of machining the work according to claim 9, further comprising the steps of: starting the machining of the work by the tool attached to the second tool post or that of the work by the tool attached to the first tool post behind a machining start timing of the work by the tool attached to the first tool post or that of the work by the tool attached to the second tool post.

14. The method of machining the work according to claim 9, wherein the tool attached to the second tool post includes a tool for machining a hole inner peripheral surface or an outer peripheral surface of the work, and a cutting edge of the tool is directed in a direction crossing at right angles to a superposed movement direction of the second tool post with respect to the first tool post during the machining of the work.

\* \* \* \* \*